United States Patent
Streiter et al.

(10) Patent No.: US 12,202,527 B2
(45) Date of Patent: Jan. 21, 2025

(54) METHOD FOR TERMINATING AN AUTOMATED DRIVING OPERATION OF A VEHICLE

(71) Applicant: MERCEDES-BENZ GROUP AG, Stuttgart (DE)

(72) Inventors: Ralph Streiter, Böblingen (DE); Albin Remäng, Gothenburg (SE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 231 days.

(21) Appl. No.: 17/795,894

(22) PCT Filed: Dec. 11, 2020

(86) PCT No.: PCT/EP2020/085698
§ 371 (c)(1),
(2) Date: Jul. 28, 2022

(87) PCT Pub. No.: WO2021/151570
PCT Pub. Date: Aug. 5, 2021

(65) Prior Publication Data
US 2023/0110341 A1     Apr. 13, 2023

(30) Foreign Application Priority Data
Jan. 29, 2020 (DE) .............. 10 2020 000 524.1

(51) Int. Cl.
*B60W 60/00* (2020.01)
*B60W 30/095* (2012.01)
(Continued)

(52) U.S. Cl.
CPC .... *B60W 60/0053* (2020.02); *B60W 30/0956* (2013.01); *B60W 50/10* (2013.01);
(Continued)

(58) Field of Classification Search
CPC ......... B60W 60/0053; B60W 30/0956; B60W 50/10; B60W 2050/0056; B60W 2420/24;
(Continued)

(56) References Cited

U.S. PATENT DOCUMENTS

| 4,139,232 A | 2/1979 | Cerf et al. |
| 8,095,271 B2 | 1/2012 | Lee |

(Continued)

FOREIGN PATENT DOCUMENTS

| CN | 105984485 A | 10/2016 |
| CN | 109204449 A | 1/2019 |

(Continued)

OTHER PUBLICATIONS

James S. Walker; "Physics 100A Homework 11—Chapter 11 (part 1);" Physics; 2010; Pearson Education, Inc; 4th Edition; 11-3.*

(Continued)

*Primary Examiner* — Andrew R Dyer
(74) *Attorney, Agent, or Firm* — PATENT PORTFOLIO BUILDERS PLLC

(57) ABSTRACT

A method for terminating an automated driving function of a vehicle involves deactivating the driving function by a steering intervention of a driver of the vehicle in a steering system, which includes a steering column and a steering wheel. In order to determine the steering intervention, a steering column torque at the steering column is measured and a steering wheel angle is measured. A manual torque acting on the steering wheel is estimated based on the measured steering column torque and the measured steering wheel angle. The estimation is based on a model equation of the steering system, which takes into consideration a moment of inertia of the steering wheel and a frictional torque in the steering system.

10 Claims, 2 Drawing Sheets

(51) Int. Cl.
  *B60W 50/10* (2012.01)
  *B62D 1/28* (2006.01)
  *B62D 15/02* (2006.01)
  *B60W 50/00* (2006.01)

(52) U.S. Cl.
  CPC ......... *B62D 1/286* (2013.01); *B62D 15/0215* (2013.01); *B60W 2050/0056* (2013.01); *B60W 2420/24* (2013.01); *B60W 2420/403* (2013.01); *B60W 2420/408* (2024.01); *B60W 2422/50* (2013.01); *B60W 2510/202* (2013.01); *B60W 2540/18* (2013.01); *B60W 2540/223* (2020.02); *B60W 2540/225* (2020.02)

(58) Field of Classification Search
  CPC ..... B60W 2420/403; B60W 2420/408; B60W 2422/50; B60W 2510/202; B60W 2540/18; B60W 2540/223; B60W 2540/225; B62D 1/286; B62D 15/0215; B60Y 2400/83
  USPC .......................................................... 701/23
  See application file for complete search history.

(56) References Cited

U.S. PATENT DOCUMENTS

| | | | |
|---|---|---|---|
| 9,802,623 | B2 | 10/2017 | Sugaiwa et al. |
| 9,873,453 | B2 | 1/2018 | Shah et al. |
| 10,766,497 | B2 | 9/2020 | Braunagel et al. |
| 10,843,727 | B2 | 11/2020 | Moreillon et al. |
| 10,942,075 | B2 | 3/2021 | Oschlies et al. |
| 10,996,673 | B1 * | 5/2021 | Katzourakis ........... G05D 1/021 |
| 11,097,770 | B2 | 8/2021 | Minaki et al. |
| 11,385,639 | B2 | 7/2022 | Ichikawa et al. |
| 11,584,386 | B2 | 2/2023 | Chiba |
| 2017/0350777 | A1 * | 12/2017 | Oschlies .................. G01L 3/16 |
| 2018/0154936 | A1 | 6/2018 | Yamasaki et al. |
| 2019/0092380 | A1 * | 3/2019 | Miccinilli ........... B62D 15/024 |
| 2019/0286127 | A1 | 9/2019 | Watanabe et al. |
| 2019/0315398 | A1 * | 10/2019 | Moreillon ........... B62D 5/0463 |

FOREIGN PATENT DOCUMENTS

| | | |
|---|---|---|
| CN | 110087962 A | 8/2019 |
| CN | 110271532 A | 9/2019 |
| DE | 102004057262 A1 | 6/2006 |
| DE | 102007039332 A1 | 2/2008 |
| DE | 102006057842 A1 | 6/2008 |
| DE | 102009028647 A1 | 2/2011 |
| DE | 102010048913 A1 | 6/2011 |
| DE | 102010041108 A1 | 3/2012 |
| DE | 102012215305 A1 | 3/2013 |
| DE | 102016007187 A1 | 6/2017 |
| DE | 102017107785 A1 | 10/2017 |
| DE | 102016209833 A1 | 12/2017 |
| DE | 102017203735 A1 | 9/2018 |
| DE | 102018202847 A1 | 9/2018 |
| EP | 1623907 A1 | 2/2006 |
| EP | 3569476 A1 | 11/2019 |
| JP | 2016151815 A | 8/2016 |
| JP | 2016175614 A | 10/2016 |
| JP | 2017007484 A | 1/2017 |
| JP | 2017019436 A | 1/2017 |
| JP | 2018039440 A | 3/2018 |
| JP | 2019014468 A | 1/2019 |
| JP | 2019107978 A | 7/2019 |
| JP | 2019182393 A | 10/2019 |
| WO | 2016088704 A1 | 6/2016 |

OTHER PUBLICATIONS

Bessel Filter; Jan. 24, 2013; Texas Instruments; ti.com; pp. 1-2.*
Office Action dated Jul. 11, 2023 in related/corresponding JP Application No. 2022-544346.
Notification of Reasons for Refusal dated Jan. 16, 2024 in related/corresponding JP Application No. 2022-544346.
International Search Report mailed Apr. 8, 2021 in related/corresponding International Application No. PCT/EP2020/085698.
Office Action dated Mar. 27, 2024 in related/corresponding CN Application No. 202080094889.8.
Office Action dated Jun. 28, 2024 in related/corresponding KR Application No. 10-2022-7024469.

* cited by examiner

METHOD FOR TERMINATING AN AUTOMATED DRIVING OPERATION OF A VEHICLE

BACKGROUND AND SUMMARY OF THE INVENTION

Exemplary embodiments of the invention relate to a method for terminating an automated, in particular highly automated, driving operation of a vehicle.

DE 102016007187 A1 discloses terminating automated driving operation depending on a manual steering torque applied by the driver to the steering wheel of the vehicle.

DE 102006057842 A1 discloses terminating a transverse control function of a vehicle by a steering wheel actuation by the driver if the absolute value of the extent of the steering wheel actuation exceeds a threshold predefinable depending on the situation.

Usually, the manual steering torque is measured using a torque sensor, in particular a torsion bar sensor, on the steering column. It is assumed here that the steering torque measured at the steering column corresponds to the manual steering torque actually applied. This assumption, however, is not accurate in particular for rapid steering interventions of the system. The measured steering torque may then deviate significantly from the manual torque actually applied. This may lead to an undesired termination of the automated driving operation if the termination criterion is satisfied by the measured steering torque, but is not satisfied by the manual steering torque actually applied.

Exemplary embodiments of the invention are directed to an improved method for terminating an automated, in particular highly automated, driving operation of a vehicle.

In a method according to the invention for terminating an automated driving function of a vehicle, the driving function is deactivated by a steering intervention of a driver of the vehicle in a steering system, comprising a steering column and a steering wheel, wherein, to determine the steering intervention, a steering column torque at the steering column is measured. In accordance with the invention, a steering wheel angle is also measured, wherein a manual torque acting on the steering wheel is estimated based on the measured steering column torque and the measured steering wheel angle, wherein the estimation is based on a model equation of the steering system, which takes into consideration a moment of inertia of the steering wheel and a frictional torque in the steering system.

According to the invention, the manual torque is estimated by means of the measured steering column torque and the measured steering wheel angle, wherein the estimation is based on a model equation of the steering system, which takes into consideration the inertia of the steering wheel and the frictional torque in the steering system.

The method according to the invention offers a more robust estimation of the manual torque than methods known from the prior art and is more robust in respect of unintentional terminations.

The method according to the invention is used to estimate the correct manual torque exerted by the driver on the steering wheel when there is no torque sensor provided on the steering wheel. During automated driving, the estimated manual torque is monitored continuously, in order to detect whether the driver would like to take over control of the vehicle.

The method according to the invention filters out torque introduced by a transverse controller so that a more accurate estimation of the manual torque at the steering wheel applied by the driver is possible. This is particularly advantageous during automated driving operation, since the detection of an intention of the driver to take over control and the deactivation of an autopilot are implemented depending on the manual torque.

In one embodiment, the automated driving function is terminated if the steering intervention exceeds a predefinable deactivation threshold.

In one embodiment the deactivation threshold is predefined depending on the situation, in particular depending on whether the driver is holding the steering wheel with at least one hand, whether the driver is observing a traffic situation ahead of the vehicle, and/or whether there is a lateral collision risk in the effective direction of the manual torque.

In one embodiment, the deactivation threshold is predefined in such a way that, to terminate the automated driving operation,
  a small manual torque is sufficient if the driver is holding the steering wheel with at least one hand,
  a medium manual torque is necessary if the driver is not holding the steering wheel with any hands,
  a high manual torque is necessary if the driver is not observing the traffic situation ahead of the vehicle or if there is a lateral collision risk in the effective direction of the manual torque.

In particular, a sufficiently small manual torque shall be understood here to mean a manual torque of which the absolute value is greater than a predefined first threshold value, a necessary medium manual torque shall be understood to mean a manual torque of which the absolute value is greater than a predefined second threshold value, and a necessary high manual torque shall be understood to mean a manual torque of which the absolute value is greater than a predefined third threshold value, wherein the first threshold value is lower than the second threshold value, and the second threshold value is lower than the third threshold value. For example, a sufficiently small manual torque is present at a value of 3 Nm, a necessary medium manual torque is present at a value of 6 Nm, and a necessary high manual torque is present at a value of 8 Nm.

In one embodiment, it is detected by way of sensor, in particular by means of a capacitive steering wheel, whether the driver is holding the steering wheel with at least one hand, and/or it is determined by means of a camera monitoring the driver, in particular by means of viewing direction recognition, whether the driver is observing the traffic situation, and/or a lateral collision risk is detected by at least one ambient sensor, in particular radar, lidar and/or camera.

In one embodiment, the manual torque is estimated by subtracting, from the measured steering column torque, a product formed from the moment of inertia and the second time derivative of the steering wheel angle and also a product formed from the frictional torque and the first time derivative, which is dependent on the rotation direction, of the steering wheel angle.

In one embodiment, the time derivatives are calculated via a low-pass filtering, in particular with a third-order Bessel filter. The steering wheel angle is a discrete-time variable determined in a clocked manner. The determination of the time derivatives of such variables can lead to high noise contributions on account of the discretization.

In one embodiment, a parameterization mode is provided, in which no manual torque is applied by the driver, wherein a steering actuator is actuated by a transverse controller in such a way that it applies predefined pulses of a simulated steering torque to the steering rod, wherein the simulated steering torque is compared with the measured steering column torque, wherein the parameters constituted by moment of inertia, frictional torque, and optionally a dead time (for example by CAN transfer of the measurement data) are modelled in such a way that the simulated steering torque matches the measured steering column torque.

In one embodiment, an offset torque and/or a measurement filter (in particular with low-pass effect induced by the measurement arrangement) are also taken into consideration.

In accordance with one aspect of the present invention, a vehicle is specified, having a steering system with a steering column and a steering wheel, wherein an automated driving function is implemented in the vehicle and can be deactivated by a steering intervention of a driver of the vehicle in the steering system, wherein a torque sensor is provided on the steering column to measure a steering column torque, wherein a steering wheel angle sensor for measuring a steering wheel angle and a control unit are arranged in the vehicle, wherein the control unit is configured to carry out the above-described method.

Exemplary embodiments of the invention will be explained in greater detail hereinafter with reference to drawings.

BRIEF DESCRIPTION OF THE DRAWING FIGURES

Parts corresponding to one another are provided in all figures with like reference signs.

DETAILED DESCRIPTION

Figure 1:
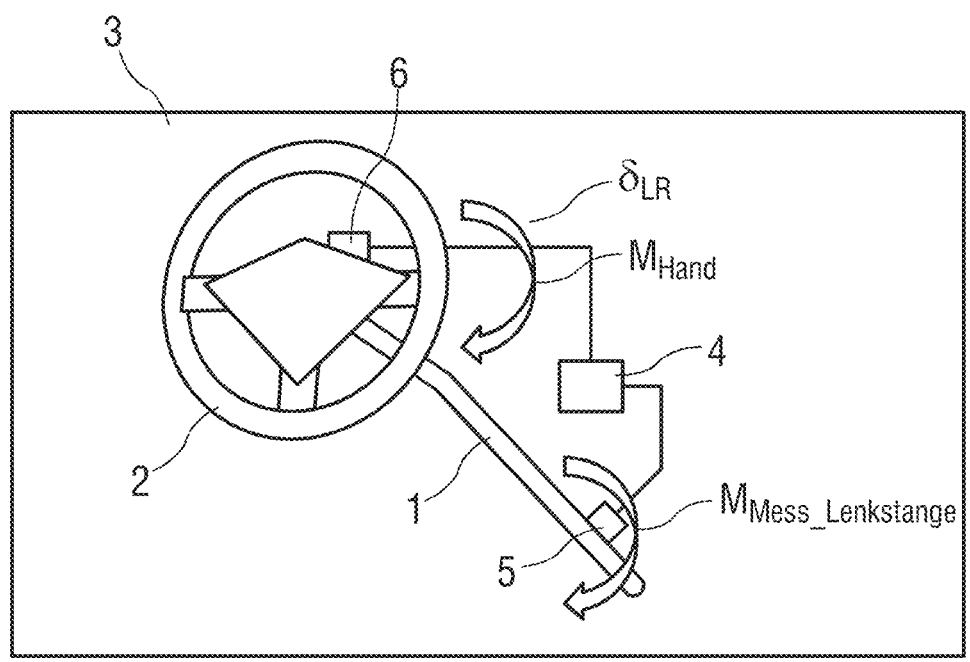
FIG. 1 shows a schematic view of a steering column with a steering wheel.

FIG. 1 shows a schematic view of a steering column 1 with a steering wheel 2 for a vehicle 3, in particular a motor vehicle.

In a method according to the invention, a steering column torque $M_{Mess\_Lenkstange}$ at the steering column 1 is measured, for example by means of a torque sensor 5. Furthermore, a steering wheel angle $\delta_{LR}$ is measured, for example by means of a rotary angle sensor 6. A manual torque $M_{Hand}$ acting on the steering wheel 2 is not measured. The method is used to determine the manual torque $M_{Hand}$ from the steering column torque $M_{Mess\_Lenkstange}$.

It is known to determine the manual torque $M_{Hand}$ indirectly by measuring the steering column torque $M_{Mess\_Lenkstange}$ in the vehicle 3. The steering column torque $M_{Mess\_Lenkstange}$ is measured, for example, using a strain sensor, which is arranged in the vehicle 3 on the steering rod 1 directly above a steering system. The assumption that the manual torque $M_{Hand}$ at the steering wheel 2 is equal to the steering column torque $M_{Mess\_Lenkstange}$ can be considered to be valid during automated driving for slow steering movements, but not for rapid, automated steering movements, since these likewise introduce a torque.

In accordance with the invention, a method is proposed that determines the steering column torque $M_{Mess\_Lenkstange}$, for example, by means of the strain sensor, and which also uses a rotary angle sensor 6 on the steering wheel 2. The method is modelled by means of parameters, for example a frictional torque $M_R$ of the steering rod 1 and a moment of inertia $\Theta_{LR}$ of the steering wheel 2, which can be obtained from measurement data of the vehicle 3. The method, using two information sources, for example sensors, together with the knowledge of identified system parameters, for example the frictional torque $M_R$ and the moment of inertia $\Theta_{LR}$, allows an estimation of torque introduced by rapid automated steering movements, in order to filter this torque out, so that the remaining torque is at least approximately equal to the manual torque actually applied at the steering wheel.

The following model equation of the steering system forms the basis of the calculation of the manual steering torque $M_{Hand}$ (equation in the frequency range with the complex frequency s):

$$M_{Mess\_Lenkstange} = e^{-s \cdot T_t} \cdot \frac{1}{T_{Mess} \cdot s + 1} \cdot \left( M_{Hand} + \Theta_{LR} \cdot \ddot{\delta}_{LR} + M_R \cdot \text{sign}(\dot{\delta}_{LR}) \right) \quad \text{(equation 1)}$$

The parameters have the following meaning here:

$T_t$ dead time by CAN transfer of the measurement data $$\frac{1}{T_{Mess} \cdot s + 1}$$

measurement filter, low-pass effect by measurement arrangement $\Theta_{LR}$ moment of inertia of the steering wheel
$\ddot{\delta}_{LR}$ steering angle acceleration
$M_R$ frictional torque
$\dot{\delta}_{LR}$ steering angle speed The steering wheel angle $\delta_{LR}$ is a discrete-time variable determined in a clocked manner. The determination of the time derivatives of such variables by subtraction can lead to high noise contributions on account of the discretization. Therefore, the time derivatives are preferably calculated via a low-pass filtering with a third-order Bessel filter. The following is then true:

$$\ddot{\delta} = \frac{s^2}{N_{3ter\_O\_Bessel}} \delta_{LR} \quad \text{(equation 2)}$$

$$\dot{\delta} = \frac{s}{N_{3ter\_O\_Bessel}} \delta_{LR} \quad \text{(equation 3)}$$

The denominator $N_{3ter\_O\_Bessel}$ in this case represents the third-order Bessel polynomial ($N_{3ter\_O\_Bessel} = s^3 + 6s^2 + 15s + 15$). The advantage of the Bessel filtering lies in a linear phase delay, that is to say a constant group delay in the passband, the Bessel filtering leads to a phase delay. In order to avoid errors as a result of this phase delay, all elements of the equation must be subjected to the same phase delay. All elements of the equation are therefore extended by the denominator $N_{3ter\_O\_Bessel}$. The following equation is obtained:

$$\frac{M_{Mess\_Lenkstange}}{N_{3ter\_O\_Bessel}} = e^{-sT_t} \cdot \frac{1}{T_{Mess} \cdot s + 1} \cdot \left( \frac{M_{Hand}}{N_{3ter\_O\_Bessel}} + \Theta_{LR} \cdot \frac{s^2}{N_{3ter\_O\_Bessel}} \cdot \delta_{LR} + M_R \cdot \text{sign}\left( \frac{s}{N_{3ter\_O\_Bessel}} \cdot \delta_{LR} \right) \right) \quad \text{(equation 4)}$$

For the measurement, it is advantageous to determine the parameters of this equation. This parameter determination (parameterization) is performed as follows:

A transverse controller, which in automated driving operation, that is to say in the normal operating mode, performs steering interventions at the steering system via a steering actuator, is switched to a parameterization mode. In the parameterization mode, the driver must keep his hands off the steering wheel (hands-off operation), so that $M_{Hand}=0$. The driver is advantageously prompted to do this. In the parameterization mode, the steering column torque $M_{Mess\_Lenkstange}$ and the steering wheel angle $\delta_{LR}$ are also measured, and the steering actuator is actuated by the transverse controller in such a way that it applies predefined pulses of a simulated steering torque $M_{Sim}$ to the steering column. As a result of these steering torque pulses, a steering torque $M_{Sim}$ is simulated, which is created when the vehicle 3 travels over potholes. The simulated steering torque $M_{Sim}$ is compared with the measured steering column torque $M_{Mess\_Lenkstange}$. The parameters constituted by moment of inertia $\Theta_{LR}$, frictional torque $M_R$, and dead time $T_t$ are modelled in such a way that the simulated torque $M_{Sim}$ matches the measured steering column torque $M_{Mess\_Lenkstange}$.

Figure 2:
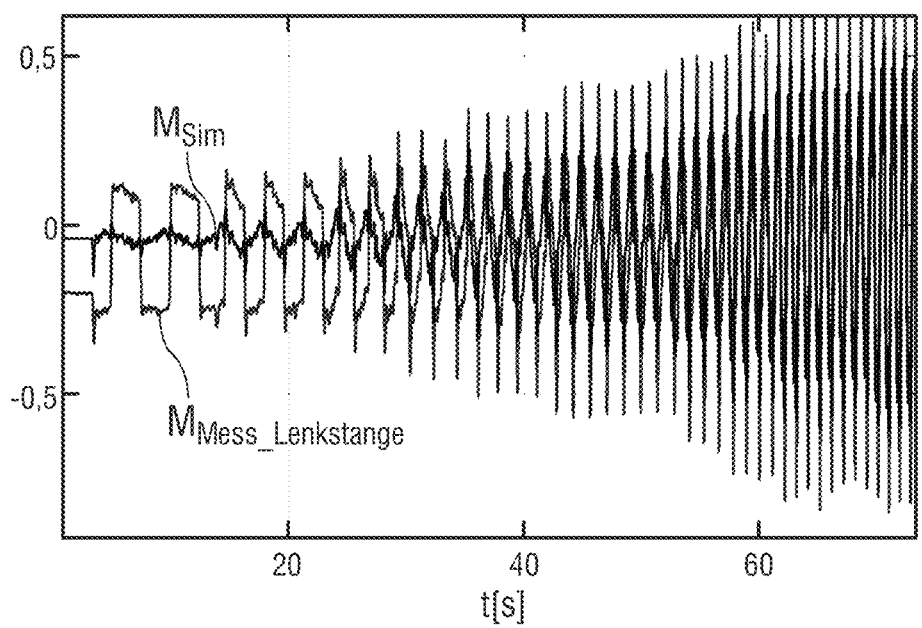
FIG. 2 shows a schematic graph with a time curve of a simulated steering torque and a measured steering column torque.

FIG. 2 shows a schematic graph with a time curve of the simulated steering torque $M_{Sim}$ and of the measured steering column torque $M_{Mess\_Lenkstange}$.

This parameterization is advantageously performed during the production of the vehicle 3, that is to say prior to delivery of the vehicle 3 to the customer, or alternatively during a visit to a garage.

To determine the manual torque $M_{Hand}$, equation 4 is solved in terms of $M_{Hand}$. The following is then obtained:

$$\frac{M_{Mess_{Lenkstange}}}{N_{3ter\_O\_Bessel}} - e^{-sT_t} \cdot \frac{1}{T_{Mess} \cdot s + 1} \cdot \left(\Theta_{LR} \cdot \frac{s^2}{N_{3ter\_O\_Bessel}} \cdot \delta_{LR} + M_R \cdot \text{sign}\left(\frac{s}{N_{3ter\_O\_Bessel}} \cdot \delta_{LR}\right)\right) = e^{-sT_t} \cdot \frac{1}{T_{Mess} \cdot s + 1} \cdot \left(\frac{1}{N_{3ter\_O\_Bessel}}\right) \cdot M_{Hand} = M^*_{Hand}$$

(equation 5)

The right side is equated to an estimated manual torque $M_{Hand}$:

$$M^*_{Hand} = e^{-sT_t} \cdot \frac{1}{T_{Mess} \cdot s + 1} \cdot \left(\frac{1}{N_{3ter\_O\_Bessel}}\right) \cdot M_{Hand}.$$

(equation 6)

The estimated manual torque $M^*_{Hand}$ deviates from the sought manual torque $M_{Hand}$, however, the deviation $\Delta=M^*_{Hand}-M_{Hand}$ is so small that $M^*_{Hand}$ is a good estimation for the sought manual torque $M_{Hand}$, and therefore can be used for the decision to terminate the automated driving operation.

In an extension of the method, the parameters can be updated over the operating time of the vehicle 3. The update is based on equation 1. For an improved presentability of the method, the contributions of the dead time $T_t$ and of the measurement filter $$\frac{1}{T_{Mess} \cdot s + 1}$$

can be ignored. A person skilled in the art, however, will readily be able to modify the following equations also to the extent that the contributions of the dead time $T_t$ and of the measurement filter $$\frac{1}{T_{Mess} \cdot s + 1}$$

are also taken into consideration. Furthermore, in equation 1 an additional offset torque $M_{off}$ is also introduced. Proceeding from equation 1, this then results in:

$$M_{Mess\_Lenkstange} = M_{Hand} + \Theta_{LR} \cdot \ddot{\delta}_{LR} + M_R \dot{\delta}_{LR} + M_{off}$$ (equation 7)

Both sides of equation 7 are summed over a multiplicity n of measurement values ($M_{Mess\_Lenkstange}$, $\delta_{LR}$). The measurement values are temporarily stored for this purpose, for example in a ring buffer. The following is then obtained $$\sum^n M_{Mess\_Lenkstange} = \sum^n \left(M_{Hand} + \Theta_{LR} \cdot \ddot{\delta}_{LR} + M_R \cdot \dot{\delta}_{LR} + M_{off}\right).$$ (equation 8)

If the sum on the right side is solved in terms of the constant factors, the following is obtained:

$$\Sigma^n M_{Mess\_Lenkstange} = \Sigma^n M_{Hand} + \Theta_{LR} \cdot \Sigma^n \ddot{\delta}_{LR} + M_R \cdot \Sigma^n \dot{\delta}_{LR} + n \cdot M_{off}$$ (equation 9)

The offset torque $M_{off}$ is determined for example as follows: From the multiple stored measurements, those measurements are identified for which the following is true:

$$\Sigma^n \ddot{\delta}_{LR}=0, \Sigma^n \dot{\delta}_{LR}=0, \Sigma^n M_{Hand}=0$$

With longer-lasting measurements, this will only ever be the case. The following is then obtained from equation 9

$$\Sigma^n M_{Mess\_Lenkstange} = n \cdot M_{off}$$

and $M_{off}$ can be updated to $$\hat{M}_{off} = M_{off} = \frac{\sum^n M_{Mess\_Lenkstange}}{n}.$$

The moment of inertia $\Theta_{LR}$ of the steering wheel can be determined as follows: From the multiplicity of stored measurements, those measurements are identified for which the following is true:

$$\Sigma^n \ddot{\delta}_{LR} \neq 0, \Sigma^n \dot{\delta}_{LR}=0, \Sigma^n M_{Hand}=0$$

With longer-lasting measurements, this will only ever be the case. The following is then obtained from equation 9

$$\Sigma^n M_{Mess\_Lenkstange} = \Theta_{LR} \cdot \Sigma^n \ddot{\delta}_{LR} + n \cdot \hat{M}_{off}$$

and $\Theta_{LR}$ can be updated to $$\hat{\Theta}_{LR} = \Theta_{LR} = \frac{\sum^n M_{Mess_{Lenkstange}} - n \cdot \hat{M}_{off}}{\sum^n \ddot{\delta}_{LR}}.$$

The frictional torque $M_R$ can be determined as follows: From the multiplicity of stored measurements, those measurements are identified for which the following is true:

$$\Sigma^n \ddot{\delta}_{LR}=0, \Sigma^n \dot{\delta}_{LR} \neq 0, \Sigma^n M_{Hand}=0$$

With longer-lasting measurements, this will only ever be the case. The following is then obtained from equation 9

$$\Sigma^n M_{Mess\_Lenkstange} = M_R \cdot \Sigma^n \dot{\delta}_{LR} + n \cdot \hat{M}_{off}.$$

and $M_R$ can be updated to $$\hat{M}_R = M_R = \frac{\sum^n M_{Mess_{Lenkstange}} - n \cdot \hat{M}_{off}}{\sum^n \dot{\delta}_{LR}}.$$

In this way, parameter changes that occur on account of signs of wear or signs of aging during operation with the customer can also be corrected during operation.

The termination criterion is satisfied when the manual torque $M_{Hand}$ exceeds a predefinable deactivation threshold, wherein the deactivation threshold is predefined depending on the situation, in particular depending on whether the driver is holding the steering wheel by at least one hand or no hands (hands-on-/hands-off situation), whether or not the driver is monitoring the traffic situation ahead of the vehicle 3, and/or whether there is a lateral collision risk in the effective direction of the manual torque.

In particular, the deactivation threshold is predefined in such a way that, to terminate the automated driving operation,
- a small manual torque (for example 3 Nm) is sufficient if a hands-on situation is present,
- a medium manual torque for example 6 Nm) is necessary if a hands-off situation is present,
- a high manual torque (for example 8 Nm) is necessary if the driver is not observing the traffic situation ahead of the vehicle 3 or if there is a lateral collision risk in the effective direction of the manual torque.

The detection of whether a hands-on or hands-off situation is present can be implemented by sensor, for example by means of a capacitive steering wheel. The detection of whether the driver is observing the traffic situation can be implemented using a camera that monitors the driver, for example by means of viewing direction recognition. The detection of the lateral collision risk can be implemented using conventional ambient sensors, for example radar, lidar, or camera.

The method can be implemented in a control unit 4 arranged in the vehicle 3.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for terminating an automated driving function of a vehicle, the method comprising:
   determining whether there is a steering intervention of a driver of the vehicle in a steering system, which comprises a steering column and a steering wheel, wherein, the determination of the steering intervention involves
   measuring a steering column torque at the steering column;
   measuring a steering wheel angle of the steering wheel;
   estimating a manual torque acting on the steering wheel based on the measured steering column torque and the measured steering wheel angle, wherein the estimation of the manual torque is based on a model equation of the steering system, wherein the model equation takes into consideration a moment of inertia of the steering wheel and a frictional torque in the steering system; and
   deactivating the automated driving function based on the determination of whether there is a steering intervention of the driver of the vehicle,
   wherein the manual torque is estimated by the following formula
   MT=MSCT−(Product1)−(Product2), wherein MT is the manual torque, subtracting, from MSCT is the measured steering column torque, Product1 is a product formed from the moment of inertia and a second order time derivative of the steering wheel angle, Product2 is a product formed from the frictional torque and a first order time derivative of the steering wheel angle, and the first order time derivative of the steering wheel angle is dependent on a rotation direction.

2. The method of claim 1, wherein the automated driving function is terminated if the determined steering intervention exceeds a predefined deactivation threshold.

3. The method of claim 2, wherein the predefined deactivation threshold is predefined depending on depending on whether the driver is holding the steering wheel with at least one hand, whether the driver is observing a traffic situation ahead of the vehicle, or whether there is a lateral collision risk in an effective direction of the estimated manual torque.

4. The method of claim 3, wherein it is determined whether the driver is holding the steering wheel with at least one hand, whether the driver is not holding the steering wheel with any hands, whether the driver is not observing the traffic situation ahead of the vehicle, whether there is a lateral collision risk in the effective direction of the manual torque, whether the estimated manual torque exceeds a first threshold, whether the estimated manual torque exceeds a second threshold, and whether the estimated manual torque exceeds a third threshold, wherein the second threshold is higher than the first threshold and the third threshold is higher than the second threshold, and wherein the predefined deactivation threshold is predefined in such a way that the automated driving function is deactivated:
   in response to determining that the driver is holding the steering wheel with the at least one hand and the estimated manual torque exceeds the first threshold;
   in response to determining the driver is not holding the steering wheel with any hands and the estimated manual torque exceeds the second threshold; and
   in response to determining the driver is not observing the traffic situation a head of the vehicle or if it is determined there is the lateral collision risk in the effective direction of the manual torque, and if the estimated manual torque exceeds the third threshold.

5. The method of claim 4, wherein whether the driver is holding the steering wheel with the at least one hand is determined using a capacitive steering wheel, whether the driver is observing the traffic situation is determined based on a viewing direction recognition using a camera monitoring the driver, or whether there is the lateral collision risk is determined using radar, lidar, or a camera.

6. The method of claim 1, wherein the model equation also accounts for an offset torque or a measurement filter.

7. A vehicle, comprising:
an automated driving function;
a steering system comprising a steering column and a steering wheel;
a torque sensor arranged on the steering column and configured to measure a steering column torque;
a steering wheel angle sensor configured to measure a steering wheel angle of the steering wheel; and
a control unit configured to
determine whether there is a steering intervention of a driver of the vehicle in the steering system, wherein the determination of the steering intervention involves
measuring a steering column torque at the steering column;
measuring a steering wheel angle of the steering wheel;
estimating a manual torque acting on the steering wheel based on the measured steering column torque and the measured steering wheel angle, wherein the estimation of the manual torque is based on a model equation of the steering system, wherein the model equation takes into consideration a moment of inertia of the steering wheel and a frictional torque in the steering system; and
deactivate the automated driving function based on the determination of whether there is a steering intervention of the driver of the vehicle,
wherein the manual torque is estimated by the following formula
MT=MSCT−(Product1)−(Product2), wherein MT is the manual torque, MSCT is the measured steering column torque, Product1 is a product formed from the moment of inertia and a second order time derivative of the steering wheel angle, and Product2 is a product formed from the frictional torque and a first order time derivative of the steering wheel angle, and the first order time derivative of the steering wheel angle is dependent on a rotation direction.

8. A method for terminating an automated driving function of a vehicle, the method comprising:

determining whether there is a steering intervention of a driver of the vehicle in a steering system, which comprises a steering column and a steering wheel, wherein, the determination of the steering intervention involves
measuring a steering column torque at the steering column;
measuring a steering wheel angle of the steering wheel;
estimating a manual torque acting on the steering wheel based on the measured steering column torque and the measured steering wheel angle, wherein the estimation of the manual torque is based on a model equation of the steering system, wherein the model equation takes into consideration a moment of inertia of the steering wheel and a frictional torque in the steering system; and
deactivating the automated driving function based on the determination of whether there is a steering intervention of the driver of the vehicle,
wherein the manual torque is estimated by the following formula
MT=MSCT−(Product1)−(Product2), wherein MT is manual torque, MSCT is the measured steering column torque, Product1 is a product formed from the moment of inertia and a second time derivative of the steering wheel angle, Product2 is a product formed from the frictional torque and a first time derivative of the steering wheel angle, and the first time derivative is dependent on a rotation direction,
wherein the first and second time derivatives are calculated via using a third-order Bessel filter.

9. The method of claim 8, further comprising:
performing a parameterization modelling during which no manual torque is applied by the driver, wherein the parameterization comprises
actuating, by a transverse controller, a steering actuator in such a way that the steering actuator applies predefined pulses of a simulated steering torque to the steering column; and
comparing the simulated steering torque with the measured steering column torque, wherein the parameters constituted by moment of inertia, frictional torque and a dead time are modelled in such a way that the simulated steering torque matches the measured steering column torque.

10. The method of claim 8, wherein the model equation also accounts for an offset torque or a measurement filter.

* * * * *